United States Patent [19]
Sugiyama et al.

[11] Patent Number: 6,054,199
[45] Date of Patent: Apr. 25, 2000

[54] OPTICAL RECORDING MEDIUM

[75] Inventors: Toshinori Sugiyama, Tsukuba; Masashi Suenaga, Kitasouma-gun; Hitoshi Watanabe, Yuuki-gun; Shinitsu Kinoshita, Toride; Hirofumi Sukeda, Tokorozawa; Hisataka Sugiyama, Kodaira, all of Japan

[73] Assignees: Hitachi Maxell, Ltd., Osaka; Hitachi, Ltd., Tokyo, both of Japan

[21] Appl. No.: 09/155,988

[22] PCT Filed: Apr. 10, 1997

[86] PCT No.: PCT/JP97/01230

§ 371 Date: Feb. 8, 1999

§ 102(e) Date: Feb. 8, 1999

[87] PCT Pub. No.: WO97/38421

PCT Pub. Date: Oct. 16, 1997

[30] Foreign Application Priority Data

Apr. 10, 1996 [JP] Japan .................................. 8-113250

[51] Int. Cl.[7] .................................................. B32B 3/00
[52] U.S. Cl. ...................... 428/64.1; 428/64.4; 428/64.5; 428/913; 430/270.13; 430/495.1; 430/945; 369/275.4; 369/283
[58] Field of Search .................. 428/64.1, 64.2, 428/64.4, 64.5, 913; 430/270.13, 495.1, 945; 369/275.1, 275.4, 283

[56] References Cited

U.S. PATENT DOCUMENTS 5,583,847 12/1996 Takeshima et al. .................. 369/275.4
5,856,969 1/1999 Nishiyama ............................ 368/275.4
5,898,663 4/1999 Miyamoto et al. ................... 369/275.4
5,970,027 10/1999 Narita et al. .............................. 369/13

FOREIGN PATENT DOCUMENTS

| 6-318535 | 1/1988 | Japan . |
| 63-131345 | 6/1988 | Japan . |
| 1201844 | 8/1989 | Japan . |
| 2177027 | 7/1990 | Japan . |
| 6338064 | 12/1994 | Japan . |
| 785503 | 3/1995 | Japan . |

*Primary Examiner*—Elizabeth Evans
*Attorney, Agent, or Firm*—Birch, Stewart, Kolasch & Birch, LLP

[57] ABSTRACT

A high density optical recording medium having wide-width grooves capable of reliable tracking is provided. The optical recording medium is formed with the wide-width grooves 12 in which a width g of the groove 12 is larger than a width L of a land between the grooves. The lands 11 and the grooves 12 are formed so that a track pitch Tp is less than 1 $\mu$m, and a land height h from a groove bottom surface 13 satisfies $[(\lambda/(8n))\cdot L\tan\theta]/[L\tan\theta-(\lambda/(8n))] \leq h \leq [(\lambda/(5n))\cdot L\tan\theta]/[L\tan\theta-(\lambda/(5n))]$ with respect to a wavelength $\lambda$ of a reproducing light beam and a refractive index n of a substrate. An angle of inclination of a groove side wall is represented by $\theta$, and the refractive index of the substrate is represented by n. Even when the width L and the height h of the land is changed due to any optical blur, the disturbance of diffracted light from a land shoulder 19 is suppressed, making it possible to obtain a stable track position control signal.

6 Claims, 6 Drawing Sheets

CURVATURE OF LAND SHOULDER (nm)

Fig. 6

GROOVE/LAND WIDTH RATIO

OPTICAL RECORDING MEDIUM

This application is the national phase under 35 U.S.C. §371 of prior PCT International Application No. PCT/JP97/01230 which has an International filing date of Apr. 10, 1997 which designated the United States of America, the entire contents of which are hereby incorporated by reference.

TECHNICAL FIELD

The present invention relates to an optical recording medium for optically recording and reproducing information thereon. In particular, the present invention relates to an optical recording medium formed with a wide-width groove as a data-recording area.

BACKGROUND ART

Figure 8:
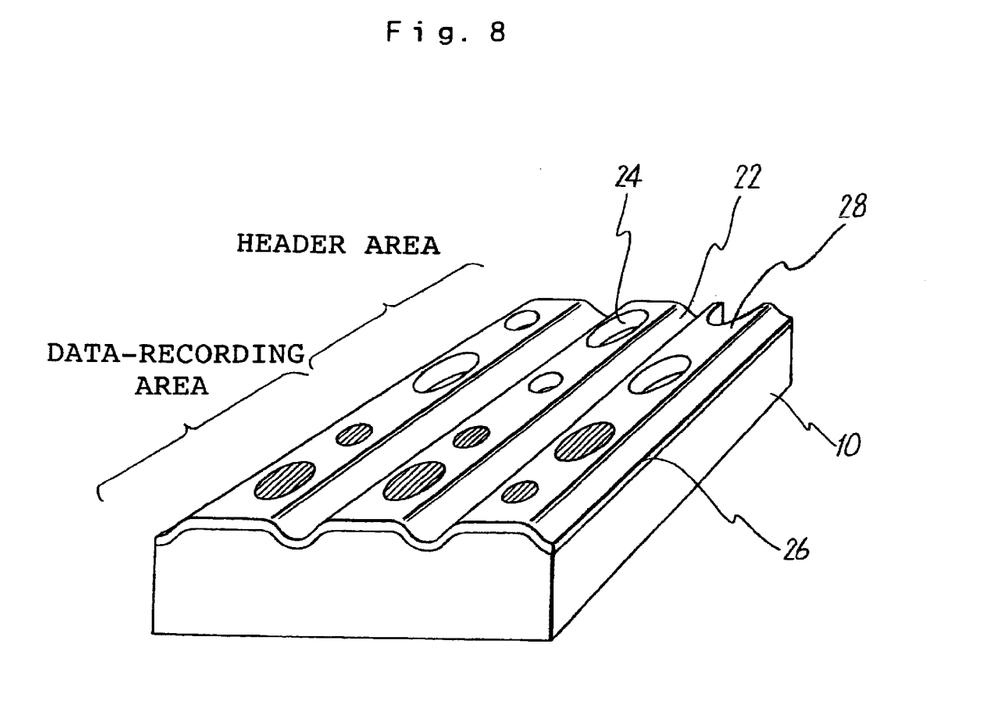
FIG. 8 shows an outline of a surface structure of a conventional magneto-optical recording medium.

FIG. 8 shows an outline of a surface structure of a conventional magneto-optical recording medium. The magneto-optical recording medium comprises a multi-layered film 26 composed of at least one layer of a magnetic recording film and a reflective film or the like formed on a transparent substrate 10 via an insulative film. The substrate 10 includes grooves 22 and prepits 24 which are previously formed in a direction along the track by means of injection molding. Lands (projections) 28 are defined between the grooves 22. The land 28 includes a data-recording area for recording information thereon, and a header area in which, for example, an address signal is recorded in a form of prepit 24. The track position control (tracking) is performed as follows when data are recorded and reproduced. That is, for example, the push-pull system is adopted, in which the groove 22 is irradiated with a light spot to detect diffracted light beams subjected to diffraction from the groove 22 in a divided manner in right and left directions perpendicular to the track respectively, and the track position is controlled so that the diffracted light beams have an equal intensity. The tracking must be correctly performed in order to write data at a desired position. For this purpose, it is necessary to highly accurately process the grooves 22 and the lands 28.

The substrate, which has the grooves 22 and the prepits 24 as described above, is usually formed in accordance with the following procedure. At first, a flat base disk made of glass, to which a photoresist is applied to give a predetermined thickness, is prepared. A master disk exposure apparatus is used to expose portions corresponding to the grooves and the prepits with a laser spot while rotating the glass base disk at a constant speed. The exposed base disk is subjected to a development process to remove the exposed portions so that a master disk is produced. A stamper is formed on the basis of the master disk. Further, the stamper is installed in a molding mold to perform injection molding for a plastic material with the mold. Thus, the substrate for the optical recording medium having the predetermined grooves and the prepits is reproduced.

An optical recording medium, which makes it possible to perform high density recording, is demanded as the amount of information to be processed is increased. In the case of the optical recording medium having the structure as shown in FIG. 8, the track pitch should be made narrow in order to achieve a high density. For this reason, when the groove portion is subjected to exposure by using the master disk exposure apparatus, an optical blur occurs at the land 28 adjacent to the groove 22. That is, the laser beam for exposure usually has an intensity distribution which follows the Gaussian distribution curve. The diameter of the laser spot for exposure is substantially determined by the half value width. Therefore, the outside of the portion corresponding to the groove (edge of the land) is also subjected to exposure. Accordingly, the portion corresponding to the land tends to cause surface roughness during the development process. The width and the height of the land are decreased due to the surface roughness, resulting in decrease in S/N ratio of the data signal.

Figure 1:
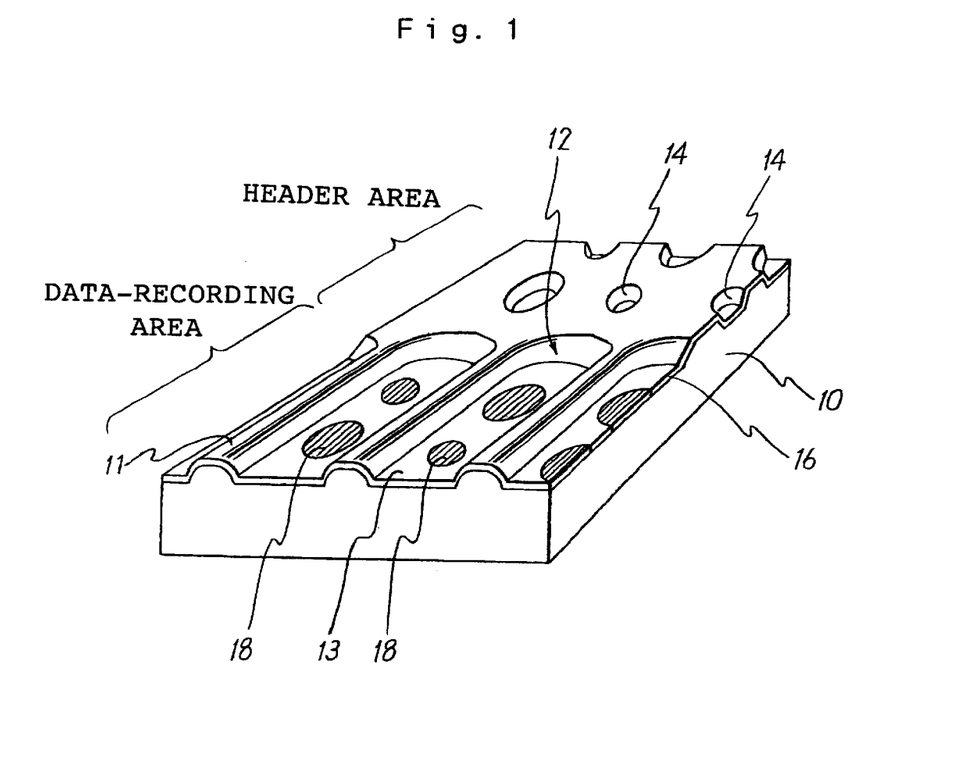
FIG. 1 shows an outline of a surface structure of a magneto-optical recording medium according to an embodiment.

An optical recording medium, for example, a so-called wide-width groove type magneto-optical disk is known concerning a structure of the optical recording medium for dissolving the problem described above, in which grooves 12 having a wide width are formed as shown in FIG. 1, and data are written in the grooves 12. In the case of the optical recording medium having such a structure, the recording signal is recorded on the groove 12 having the wide width, not on the land on which the optical blur tends to occur. Therefore, no surface roughness occurs on the recording surface. Especially, the bottom surface 13 of the groove 12 corresponds to the surface of the base material of the base disk which has excellent flatness on the master disk. Accordingly, when data are written on this surface, it is possible to avoid deterioration of S/N.

However, in the case of the substrate having the wide-width type groove, it is necessary that the portion 12 corresponding to the groove is exposed with a light beam having a relatively high intensity in order to form the groove having the wide width. As described above, data are written on the recess in the case of the optical recording medium based on the use of the substrate having the wide-width type groove. Therefore, such an optical recording medium is free from any fear of surface roughness on the recording area, but the optical blur occurs on the narrow land 11. Especially, an optical recording medium having a track pitch of not more than 1 $\mu$m, in which the track is made narrow in order to realize the high density, is greatly affected by the blur caused on the land. Further, for example, if there is any fluctuation of exposure beam intensity, or if uneven feed is caused in the radial direction during exposure effected by the master disk exposure apparatus, the change in shape of the land tends to occur at such portions. In order to avoid the change in shape due to uneven feed as described above, for example, Japanese Patent Application Laid-Open No. 1-201844 discloses a method for producing a master disk for an optical disk in which first and second laser beams are radiated in the radial direction while being separated from each other by a predetermined spacing distance during master disk exposure so that first and second exposure zones are formed on a resist film with a non-exposed zone being interposed therebetween. When this system is adopted, the change in shape of the land is small with respect to the uneven feed in the radial direction. However, the fluctuation tends to occur concerning the width of the groove on which data are recorded, resulting in decrease in S/N of a reproduced signal obtained from the data-recording area. Further, in the case of the optical recording medium having the wide-width groove, the land to serve as the projection is relatively narrow. For this reason, a gap is formed between the stamper and the resin material, and it is relatively difficult to transfer the land during molding. Therefore, the change in shape of the land tends to occur due to defective transfer. Japanese Patent Application Laid-Open No. 1-201844 refers to nothing about the countermeasure for dissolving the defective transfer. The defective transfer conspicuously occurs as the track pitch becomes narrow.

The following problem arises upon reproduction of a signal recorded on an optical recording medium having the wide-width groove in which the change in shape of the land has occurred as described above. That is, the track position control signal varies due to disturbance of the diffracted light beam from the groove, and it is impossible to perform correct tracking. This problem is more serious in the case of a high density recording medium having a track pitch of not more than 1 μm.

Japanese Patent Application Laid-Open No. 6-338064 discloses an optical disk for recording signals on both of guide grooves and lands. In this case, the depth of the guide groove has an optical length of not less than λ/7 and not more than λ/5, and the width of the guide groove is not less than 0.34×R and not more than R (R represents a beam diameter of an information-recording laser beam on a recording layer). Thus, the optical disk is prevented from deterioration of the reproduction error rate which would be otherwise caused due to the erasing residue during overwrite and the outward extension of recording marks.

Japanese Patent Application Laid-Open No. 63-18535 discloses a substrate for an optical recording medium in which pregrooves and address pits are formed on an identical track to satisfy λ/(8n)≦d≦λ/(4n) and P/2≦W<P provided that the wavelength of a recording and reproducing beam is λ, the refractive index of a light-transmissive layer is n, the track pitch is P, the phase depth of the pregroove and the address pit is d, and the width is W. This patent document reports that the use of the substrate makes it possible to improve S/N by suppressing variation in width of the land during master disk exposure by using a cutting apparatus.

An object of the present invention is to provide a high density optical recording medium having wide-width grooves which dissolves the conventional problems as described above and which makes it possible to reliably perform tracking.

As a result of repeated experiments to maintain the stability of track position control while maintaining high S/N performance of wide-width grooves in order to solve the problems as described above, the present inventors have succeeded in developing an optical recording medium capable of stable tracking by constructing the optical recording medium such that the height of lands of the optical recording medium having wide-width grooves is within a predetermined range.

DISCLOSURE OF THE INVENTION

According to a first aspect of the present invention, there is provided an optical recording medium having a transparent substrate which has a refractive index n and on which grooves are formed such that a groove width is larger than a land width between the grooves, wherein the grooves and lands are formed so that a ratio of the groove width g to the land width L satisfies 1.6≦g/L, a track pitch is not more than 1 μm, and a land height h from a groove bottom surface satisfies the following expression (1):

$$[(\lambda/(8n)) \cdot L \tan\theta]/[L \tan\theta - (\lambda/(8n))] \leq h \leq [(\lambda/(5n)) \cdot L \tan\theta/[L \tan\theta - (\lambda/(5n))] \quad (1)$$

provided that a wavelength of a reproducing light beam is λ, the land width is L, and an inclination of a groove side wall extending from the groove bottom surface to a land top is θ.

The following fact is approved for an optical recording medium, for example, a magneto-optical disk in which the track in the information-recording area is irradiated with a laser spot, and a reflected light beam (or a transmitted light beam) therefrom is used to reproduce recorded information. That is, when the track pitch is close to the wavelength of the reproducing light beam, the intensity of the diffracted light beam for tracking is maximized when the land width L is ½ of the track pitch. The diffracted light beam intensity is decreased as the land width L is separated from this value. Accordingly, if the edge of the land is subjected to exposure due to the optical blur during the master disk exposure, and the land width is a width further separated from Tp/2, then the diffracted light beam intensity is decreased. On the other hand, assuming that the cross-sectional configuration of the groove is rectangular, the land height (groove depth) h is maximized when it is λ/(8n) with respect to the wavelength λ of the reproducing light beam (n represents the refractive index of the substrate). Therefore, when the land height is designed to be higher than λ/(8n) beforehand, then the land height of the medium is decreased on account of the occurrence of the optical blur, and it approaches λ/(8n). As a result, the diffracted light beam intensity is increased. When the decrease in land width and the decrease in land height, which are brought about by the optical blur, are simultaneously caused, then the changes in diffracted light beam intensity are mutually offset, and the magnitude of fluctuation thereof can be made extremely small. On the contrary, when the amount of blur is decreased, both of the land height and the land width are increased as compared with those obtained in the foregoing case. However, the diffracted light beam intensity is decreased due to the increase in land height, while the diffracted light beam intensity is allowed to have an opposite tendency to increase owing to the increase in land width. Therefore, the amounts of both changes are offset with each other, and thus it is possible to decrease the magnitude of fluctuation. On the other hand, if the land height h is excessively high, then the amount of reflected light from the optical recording medium is decreased, and S/N is deteriorated. Thus, it has been found that the land height h should be not more than λ/(5n).

Figure 7:
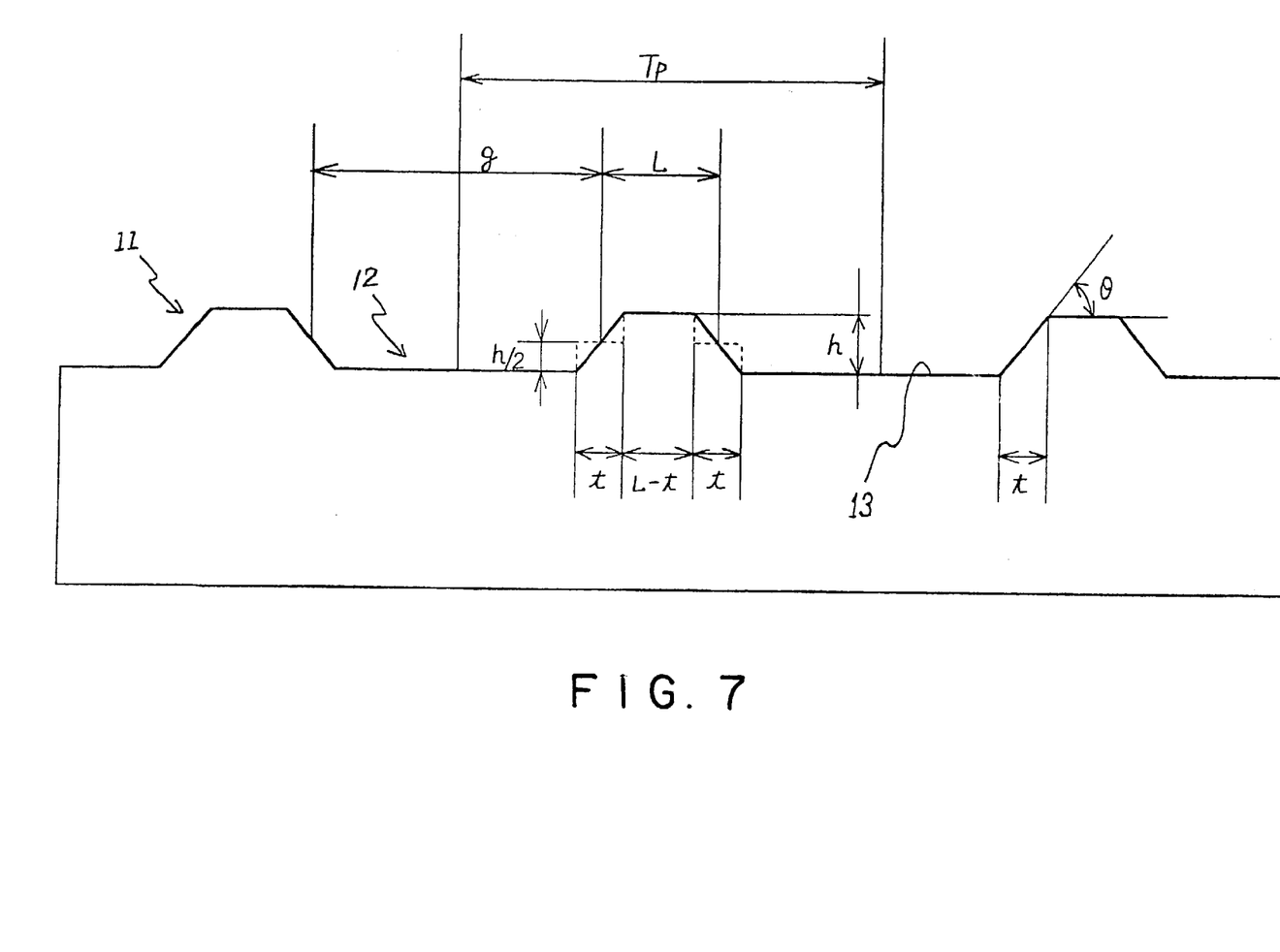
FIG. 7 conceptually shows a disk substrate used to explain the effective land height h'.

The foregoing description has been directed to the case in which the cross-sectional configuration of the groove is rectangular. The configuration of the groove of an actual optical recording medium is not rectangular as shown in FIG. 8. The groove side wall, which extends from the groove bottom surface to the land top, has a certain angle of inclination θ. On this assumption, the effective groove depth becomes shallow. In the case of the optical recording medium in which the groove width is larger than the land width between the grooves, the effective land height h' from the groove bottom surface is lower than the actual land height h. FIG. 7 shows a cross section of an optical disk having a track pitch Tp, a width g of a groove 12, a width L of a land 11, a groove inclination θ, a width t of an inclined portion, and a land height h. When a groove bottom surface 13 is used as a reference, the land width L is L+t as shown in FIG. 7. On this assumption, the inclined surface of the land-shaped portion is approximated by a step-shaped configuration having a width of t and a height of t/2 as shown by broken lines in FIG. 7. The effective height h' of the land 11 may be represented by an average height of the top of the land 11 having a height of h and a width of L−t and the two step portions each having a height of h/2 and a width of t. That is, the land height h' is expressed as follows:

$$h' = [h \cdot (L-t) + 2t \cdot h/2]/(L+t)$$

$$= h \cdot L/(L+t)$$

There is given $t=h/\tan\theta$. Therefore, the expression may be written as follows:

$$h'=(h\cdot L)/[L+h/(\tan\theta)]$$

It has been revealed by experiments performed by the present inventors that the foregoing approximation is applicable if the groove width g is wide as compared with the land width L, especially, the approximation is applicable if there is given $1.6 \leq g/L$.

If the expression is solved for h, there is given $h=L\cdot h'\tan\theta/[L\cdot\tan\theta-h']$. Moreover, it is appropriate to give $\lambda/(8n) \leq h' \leq \lambda/(5n)$ in order to satisfy both of the stability of the tracking signal and the high S/N characteristic. Therefore, the land height h may be controlled within the range of the following expression (1):

$$[(\lambda/(8n))\cdot L\tan\theta]/[L\tan\theta-(\lambda/(8n))] \leq h \leq [(\lambda/(5n))\cdot L\tan\theta]/[L\tan\theta-(\lambda/(5n))] \quad (1)$$

It is preferable for the optical recording medium of the present invention that the groove side wall extending from the groove bottom surface to the land top has an angle of inclination θ which satisfies $40° \leq \theta \leq 70°$. If the angle of inclination θ is small, i.e., if the inclination of the groove side wall is gentle, then the areal size of the groove side wall (inclined surface portion) which is greatly affected by the surface roughness due to the optical blur is increased, and the flat portion at the groove bottom becomes relatively narrow. Therefore, the S/N ratio of the reproduced signal is decreased. From this viewpoint, it is desirable that the angle of inclination θ is not less than 40°. On the other hand, if the angle of inclination θ is set to exceed 70°, then the transfer performance is deteriorated, and it is difficult to obtain the land/groove structure having the desired configuration when the substrate is reproduced by means of injection molding by using a stamper. The angle of inclination θ is measured in accordance with a measuring method as described later on.

In FIG. 7, the groove side wall is depicted by using a straight line for convenience of explanation. However, it is preferable for the optical recording medium of the present invention that the groove side wall extending from the groove bottom surface to the land top has a radius of curvature r which satisfies $20 \text{ nm} \leq r \leq 100 \text{ nm}$. If the radius of curvature r is less than 20 nm, the transfer performance is deteriorated upon injection molding. If the radius of curvature r exceeds 100 nm, then the areal size of the flat portion of the land top is decreased, and the surface roughness due to the optical blur is increased at the inclined surface portion (groove side wall) rather than at the flat portion. As a result, the S/N ratio of the reproduced signal is decreased.

It is preferable for the optical recording medium of the present invention that the ratio of the groove width g to the land width L satisfies $1.6 \leq g/L \leq 3$. If the g/L ratio is less than 1.6, then the areal size of the groove bottom having good flatness is relatively small, and the S/N ratio is decreased. On the other hand, if g/L exceeds 3, then the land width L becomes too narrow, and it is difficult to perform transfer upon reproduction by using, for example, the injection molding method.

The optical recording medium of the present invention may be applied to a magneto-optical recording medium or a phase-change recording medium capable of once-writing or writing information.

According to the optical recording medium which adopts the structure or arrangement as described above, a ratio of push-pull fluctuation upon reproduction is within 5%, and a relative reflectance is not less than 60%.

BEST MODE FOR CARRYING OUT THE INVENTION

An embodiment of the present invention will be described below with reference to the drawings. FIG. 1 shows an outline of a surface structure of a magneto-optical recording medium according to the present invention. The magneto-optical recording medium has a structure comprising a transparent substrate 10 which is previously formed by injection molding with wide-width grooves (concave grooves) and prepits (elliptic recesses) in a direction along the track. A first insulative layer composed of SiN, a recording layer composed of TbFeCo, a second insulative layer composed of SiN, a reflective layer composed of Al, and a protective layer are successively stacked on the transparent substrate 10. In FIG. 1, the multiple layers stacked on the substrate 10 are simplified, and they are depicted as one layer 16. The magneto-optical recording medium comprises wide-width grooves 12 and lands 11 which are formed in a data-recording area. Magnetic domains 18 are formed as recording signals by means of irradiation of a light beam under an external magnetic field on the bottom surface of the wide-width groove 12. On the other hand, the land/groove structure is not formed in a header area. For example, header and address information are recorded thereon beforehand as prepits 14.

The transparent substrate 10 used for the magneto-optical recording medium is subjected to exposure with the laser beam at positions corresponding to the grooves 12 and the prepits 14 by using a master disk exposure apparatus. After a development step is carried out, a master disk having the land/groove structure is formed. A stamper is produced from the master disk. Reproduction can be performed by installing the stamper in a molding mold and injection-molding a plastic material such as polycarbonate. The respective layers can be successively stacked on the plastic substrate thus obtained, by means of sputtering with a continuous sputtering apparatus by using materials as targets for forming the respective layers.

Figure 2:
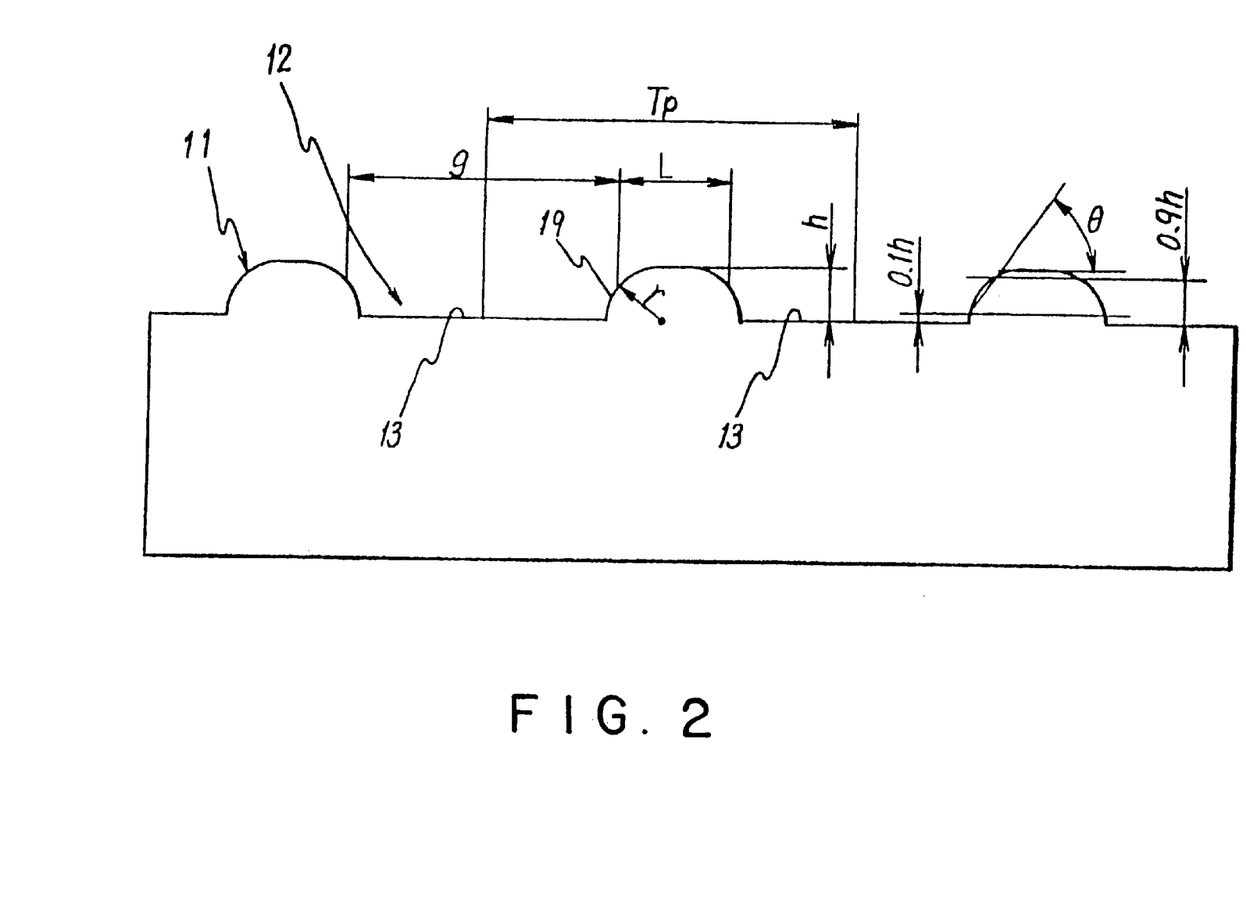
FIG. 2 shows a cross-sectional configuration in a widthwise direction across tracks of the magneto-optical recording medium shown in FIG. 1.

FIG. 2 shows a magnified cross-sectional configuration in a widthwise direction across tracks of the magneto-optical recording medium shown in FIG. 1. FIG. 2 shows no boundary between the respective layers formed on the substrate, and no boundary between the substrate and the insulative layer in order to explain the cross-sectional configuration. In FIG. 2, the height h of the land 11 represents a distance from the bottom surface 13 of the groove 12 to the flat top of the land 11 as shown in the drawing. The groove width g is a groove width based on a reference of a height position of h/2 of the side wall 19 (corresponding to the shoulder of the land 11) of the groove 12. As shown in FIG. 2, the land width L is a land width based on a reference of a height position of h/2 of the side walls disposed on both sides of the land 11. The track pitch Tp is a distance between centers of the adjacent grooves. When the side wall 19 of the land 11 forms a curved surface, the angle of inclination θ of the groove side wall is herein defined as follows. That is, as shown in FIG. 2, the angle of inclination θ is an angle formed by a straight line for connecting a portion of the groove side wall at which the height position is 0.1h concerning the land height h and a portion of the groove side wall at which the height position is 0.9h, with respect to the horizontal plane (the bottom surface 13 of the groove 12 can be regarded as the horizontal plane). The radius of curvature of the side wall (land shoulder) 19 of the groove 12 is represented by r in FIG. 2.

In order to make comparison, for example, for reproduction characteristics concerning the land height h, the angle of inclination θ of the groove side wall (land shoulder), the radius of curvature r of the groove side wall, and the groove width/land width ratio, magneto-optical recording media having the land/groove structure as shown in FIGS. 1 and 2 were produced while variously changing these values. The land height h can be controlled by appropriately changing the thickness of the resist applied to the glass plate upon master disk exposure. The angle of inclination θ of the groove side wall (land shoulder) and the radius of curvature r of the groove side wall can be appropriately controlled by changing the photosensitive characteristic of the resist applied to the master disk upon the master disk exposure and the size of the laser spot. The groove width and the land width can be controlled by changing the exposure position and the spot diameter upon the master disk exposure while considering the thicknesses of the layers stacked on the substrate. The track pitch Tp was set to be Tp=0.85 μm for all of the magneto-optical recording media. Polycarbonate was used as the material for the substrate, which had a refractive index of n=1.58. A test signal was recorded on the magneto-optical recording media by radiating a laser beam of λ=685 nm while applying an external magnetic field. The magneto-optical signal was reproduced by using a reproducing laser beam having the same wavelength (λ=685 nm).

[Relationship between land height h and ratio of push-pull fluctuation]

Figure 3:
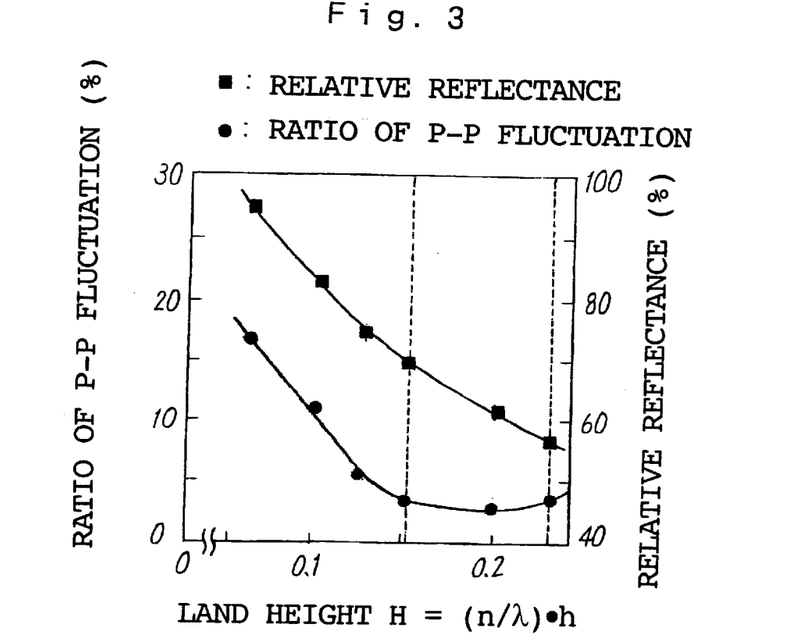
FIG. 3 shows a graph illustrating a relationship of the ratio of push-pull fluctuation and the relative reflectance with respect to the land height h.

A plurality of magneto-optical recording media, which had a radius of curvature r=40 nm of the groove side wall, a groove width g=600 nm, and a land width L=250 nm, were produced while changing the land height h to have various values. For these magneto-optical recording media, the ratio of push-pull fluctuation and the relative reflectance were measured. It is noted that the ratio of push-pull fluctuation is represented by $(P_{max}-P_{min})/(P_{max}+P_{min})$ provided that maximum and minimum values of push-pull on an identical round or perimeter are $P_{max}$ and $P_{min}$ respectively. A resist having a γ-characteristic of 2.2 was used upon the master disk exposure to appropriately control the thickness of application so that the land height h is controlled. The ratio of push-pull fluctuation was measured by using an evaluating apparatus of λ=685 nm and NA=0.55. The relative reflectance was based on a reference of a reflectance of a mirror section. FIG. 3 shows a relationship of the ratio of push-pull fluctuation and the relative reflectance with respect to various land heights h. The horizontal axis in FIG. 3 is depicted assuming that the land height satisfies H=(n/λ)·h. As understood from the result shown in FIG. 3, the ratio of push-pull fluctuation can be suppressed to be within 5% when the land height is not less than H=0.152. The control on the track position is stabilized, and consequently it is possible to perform stable recording and reproduction on the magneto-optical recording medium. The value H=0.152 corresponds to $[(\lambda/(8n))\cdot L\tan\theta]/[L\tan\theta-(\lambda/(8n))]$ under the condition described above. On the other hand, if the land height exceeds H=0.228, then the relative reflectance of the magneto-optical recording medium is not more than 60%, and the signal component is decreased. For this reason, the S/N ratio is decreased, and it becomes difficult to reproduce data. The value H=0.228 corresponds to a land height h=99 nm which corresponds to $[(\lambda/(5n))\cdot L\tan\theta]/[L\tan\theta-(\lambda/(5n))]$ under the condition described above. The angle of inclination θ of the groove side wall extending from the groove bottom surface to the land top was 50° when the land height h was 66 nm, and it was 70° when the land height h was 99 nm. According to the result shown in FIG. 3, it is understood that the land height h is appropriately set to be $[(\lambda/(8n))\cdot L\tan\theta]/[L\tan\theta-(\lambda/(8n))] \leq h \leq [(\lambda/(5n))\cdot L\tan\theta]/[L\tan\theta-(\lambda/(5n))]$.

[Relationship between angle of inclination θ of groove side wall and relative noise level]

Figure 4:
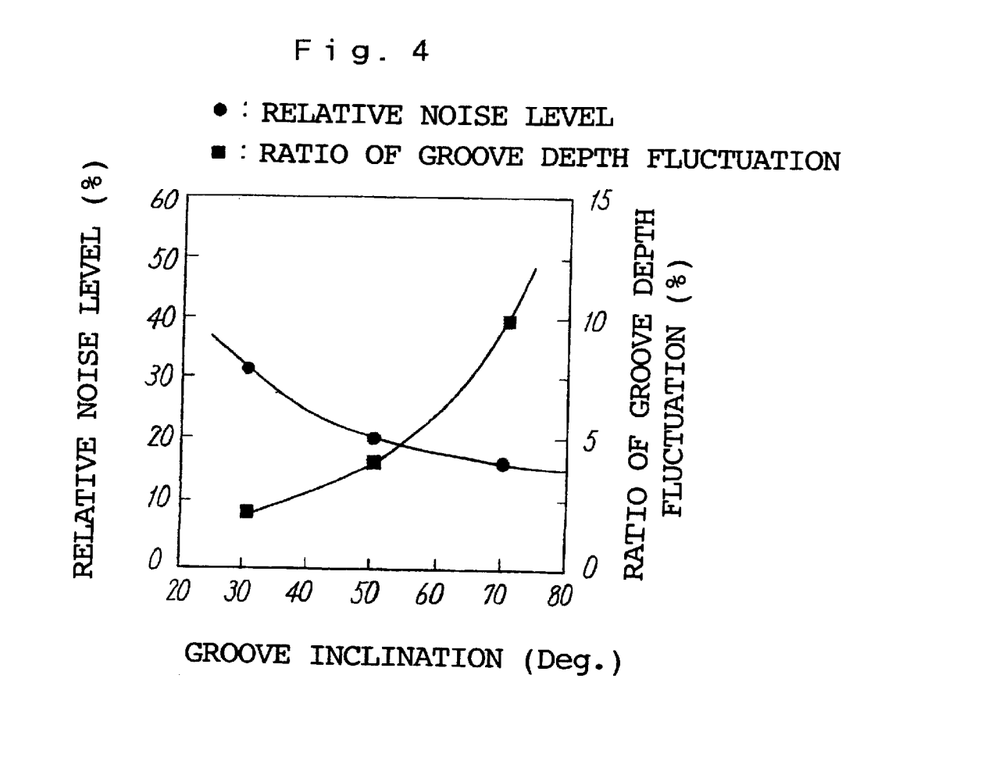
FIG. 4 shows a graph illustrating a relationship between the angle of inclination θ of the groove side wall and the relative noise level.

Only the angle of inclination θ of the groove side wall was changed to give various values while maintaining the land height h=75 nm, the radius of curvature r=40 nm, the groove width g=600 nm, and the land width L=250 nm to produce magneto-optical recording media for which the noise level and the ratio of groove depth fluctuation of the magneto-optical recording media were measured. FIG. 4 shows the relative noise level and the ratio of groove depth fluctuation of the magneto-optical recording medium with respect to the angle of inclination θ of the groove side wall. If the angle of inclination θ is less than 30°, the noise level is high, probably because of the following reason. That is, if the inclination of the groove side wall (land shoulder) is gentle, then the areal size of the groove side wall which is greatly affected by the surface roughness is increased, and the areal size of the groove bottom (flat portion) for generating the reproduced signal is relatively decreased. Therefore, it is desirable that the angle of inclination θ is not less than 40°. The reference value of the relative noise level was a noise level obtained when the entire recording surface of the magneto-optical recording medium was exposed at an exposure level equivalent to that for the groove bottom surface. On the other hand, if the angle of inclination θ exceeds 70°, the transfer performance is deteriorated when the substrate is reproduced by means of injection molding. Further, the fluctuation of land height exceeds 10%, the push-pull signal greatly fluctuates, and the normal recording and reproduction on the magneto-optical recording medium may be obstructed. Therefore, it is understood that the angle of inclination θ of the groove side wall appropriately satisfies $40° \leq \theta \leq 70°$.

[Relationship between radius of curvature r of groove side wall and relative noise level]

Figure 5:
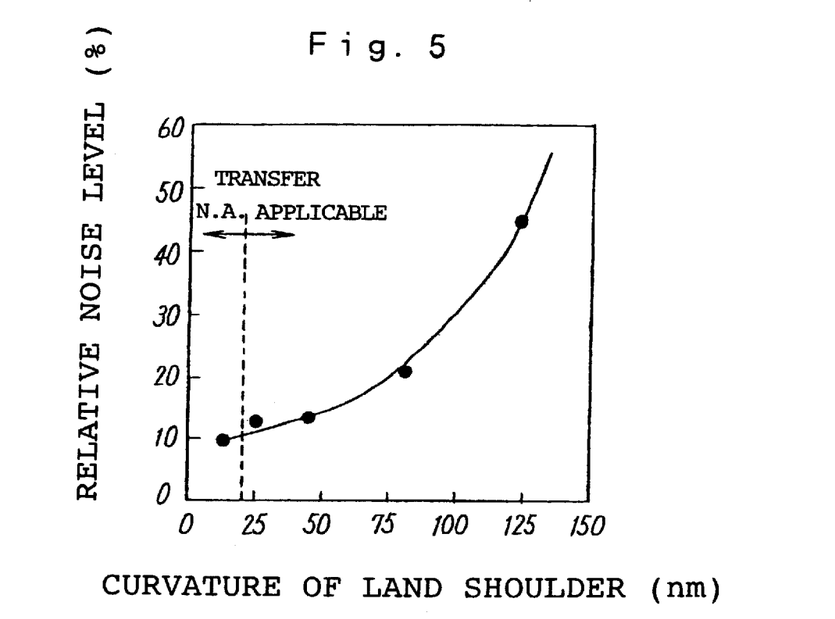
FIG. 5 shows a graph illustrating the relative noise level with respect to the radius of curvature r of the groove side wall.

Only the radius of curvature r of the groove side wall (land shoulder) was changed to give various values while giving the land height h=75 nm, the groove width g=600 nm, the land width L=250 nm, and the angle of inclination of the groove side wall θ=50° to produce magneto-optical recording media for which the relative noise level of the magneto-optical recording media was measured. FIG. 5 shows a relationship of the relative noise level and the transfer performance upon reproduction of the substrate of the magneto-optical recording medium by means of injection molding, with respect to the radius of curvature r of the groove side wall of the magneto-optical recording medium.

If the radius of curvature r of the portion intervening between the groove bottom surface and the land top is less than 20 nm, it is difficult to correctly transfer the land shape, causing a factor of fluctuation of the push-pull signal on the magneto-optical recording medium, which is undesirable. On the other hand, if the radius of curvature r exceeds 100 nm, the noise level exceeds 30%, because the areal size of the upper flat portion of the land is decreased, and the areal size of the land shoulder which is greatly affected by the surface roughness caused by exposure is increased. Therefore, it is understood that the radius of curvature r of the groove side wall preferably satisfies 20 nm≦r≦100 nm.

[Relationship of relative noise level with respect to groove width/land width ratio]

Figure 6:
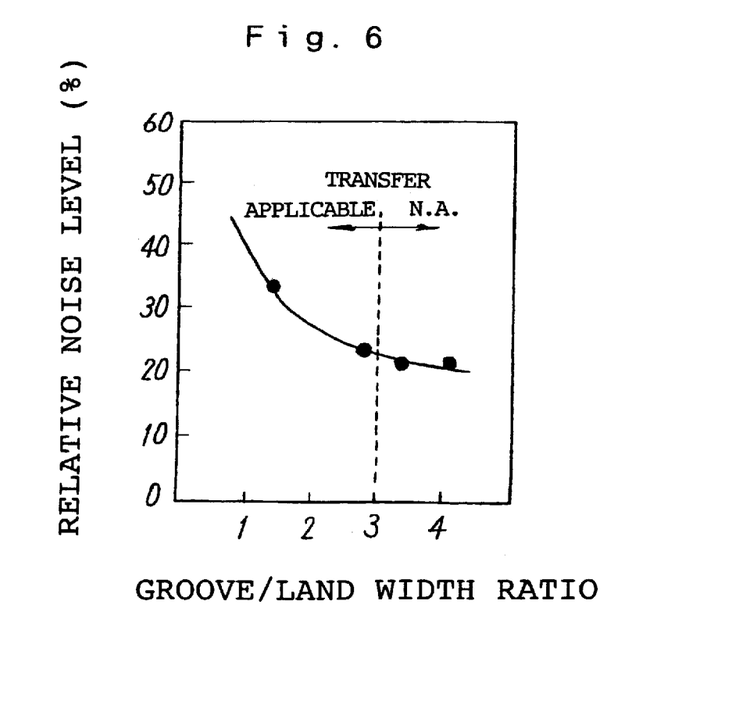
FIG. 6 shows a graph illustrating a relationship of the relative noise level with respect to the groove width/land width ratio.

Only the groove width/land width ratio was changed to give various values while giving the land height h=75 nm, the angle of inclination of the groove side wall θ=50°, and the radius of curvature of the groove side wall (land shoulder) r=40 nm to produce magneto-optical recording media for which the relative noise level was measured. FIG. 6 shows a relationship of the relative noise level and the transfer performance with respect to the value of the groove width/land width. The following result was obtained from investigation on the ratio of the width g of the groove to the width L of the land. That is, if the g/L ratio is less than 1.6, the areal size of the groove bottom having good flatness is relatively small. Therefore, the relative noise level exceeds 30%, and the S/N ratio is decreased. Accordingly, it is desirable that the g/L ratio is not less than 1.6. On the other hand, it has been revealed that if the g/L ratio exceeds 3, then the land width L becomes too narrow, and it is difficult to perform transfer upon reproduction by using, for example, the injection molding method. Therefore, it is preferable that the ratio of the groove width g to the land width L satisfies 1.6≦g/L≦3.

The magneto-optical recording medium of the present invention has been specifically explained with reference to the embodiment. However, the present invention is not limited thereto, to which various changes and improvements may be added. For example, various materials may be adopted for the materials for producing the substrate and the respective layers of the magneto-optical recording medium. It is possible to use various stacking structures therefor as well. For example, in order to provide a magneto-optical recording medium for multi-valued recording, the recording layer may be composed of multiple layers, and a variety of auxiliary layers may be provided. The optical recording medium is not limited to the magneto-optical recording medium, which may be an optical recording medium such as a phase-change optical recording medium capable of rewiring or once-writing.

According to the optical recording medium of the present invention, it is possible to obtain a stable track control signal, and it is possible to increase the reflectance during reproduction. Therefore, it is possible to perform recording and reproduction on the medium with a high S/N ratio in a stable state. Especially, the optical recording medium of the present invention is useful for a high density optical recording medium having a track pitch of not more than 1 μm.

What is claimed is:

1. An optical recording medium having a transparent substrate which has a refractive index n and on which grooves are formed such that a groove width is larger than a land width between the grooves, characterized in that:

the grooves and lands are formed so that a ratio of the groove width g to the land width L satisfies 1.6≦g/L, a track pitch is not more than 1 μm, and a land height h from a groove bottom surface satisfies the following expression (1):

$$[(\lambda/(8n))\cdot L\tan\theta]/[L\tan\theta-(\lambda/(8n))]\leq h\leq[(\lambda/(5n))\cdot L\tan\theta]/[L\tan\theta-(\lambda/(5n))] \tag{1}$$

provided that a wavelength of a reproducing light beam is λ, the land width is L, and an inclination of a groove side wall extending from the groove bottom surface to a land top is θ.

2. The optical recording medium according to claim 1, wherein the groove side wall extending from the groove bottom surface to the land top has an angle of inclination θ which satisfies 40°≦θ≦70°.

3. The optical recording medium according to claim 1, wherein the groove side wall extending from the groove bottom surface to the land top has a radius of curvature r which satisfies 20 nm≦r≦100 nm.

4. The optical recording medium according to claims 1 or 2, wherein the ratio of the groove width g to the land width L satisfies 1.6≦g/L≦3.

5. The optical recording medium according to claim 1, wherein the recording medium is a magneto-optical recording medium or a phase-change recording medium.

6. The optical recording medium according to claim 1, wherein a ratio of push-pull fluctuation is within 5%, and a relative reflectance is not less than 60%.

* * * * *